United States Patent
Cahill, Jr.

[11] Patent Number: 5,428,784
[45] Date of Patent: Jun. 27, 1995

[54] METHOD AND APPARATUS FOR LINKING ELECTRONIC MAIL AND AN ELECTRONIC CALENDAR TO PROVIDE A DYNAMIC RESPONSE TO AN ELECTRONIC MAIL MESSAGE

[75] Inventor: Robert B. Cahill, Jr., Grapevine, Tex.

[73] Assignee: International Business Machines Corporation, Armonk, N.Y.

[21] Appl. No.: 209,685

[22] Filed: Mar. 10, 1994

Related U.S. Application Data

[63] Continuation of Ser. No. 26,728, Mar. 5, 1993, abandoned.

[51] Int. Cl.$^6$ .......................... G06f 15/40; G06f 15/21
[52] U.S. Cl. .................................. 395/650; 395/100; 395/161; 395/200; 364/401; 364/705.08; 364/DIG. 2; 364/918; 364/940; 364/937; 364/949.3
[58] Field of Search ........... 364/521, 518, 401, 705.08; 395/200, 100, 650, 161

[56] References Cited

U.S. PATENT DOCUMENTS

| | | | |
|---|---|---|---|
| 4,807,154 | 2/1989 | Scully et al. | 364/518 |
| 4,977,520 | 12/1990 | McGaughey, IV et al. | 364/521 |
| 5,070,470 | 12/1991 | Scully et al. | 364/705.08 |
| 5,093,901 | 3/1992 | Cree et al. | 395/100 |
| 5,124,912 | 6/1992 | Hotaling et al. | 364/401 |
| 5,197,000 | 3/1993 | Vincent | 364/401 |

OTHER PUBLICATIONS

Lotus to develop workgroup apps; Notes update part of Lotus' broader communications outlook. InfoWorld. Jan. 18, 1993, p 1+.
BeyondMail links up with two scheduling products. InfoWorld. Jan. 18, 1993, p. 35.
Vincent, J. P. Electronic Due Dates. IBM TDB, No. 9b, Feb. 1990, pp. 345–347.

*Primary Examiner*—Eddie P. Chan
*Attorney, Agent, or Firm*—A. Bruce Clay

[57] ABSTRACT

A dynamic response to an electronic message is provided to a sender without requiring any additional action on the part of an addressee. When a message is received, a search is conducted on the addressee's electronic calendar. If an event is found in which a receipt time of the message falls between the start and stop time thereof, a response is provided to the sender so indicating. The response may be tailored as desired to include such information as what the event is, start/stop time of the event, and who the event concerns.

6 Claims, 2 Drawing Sheets

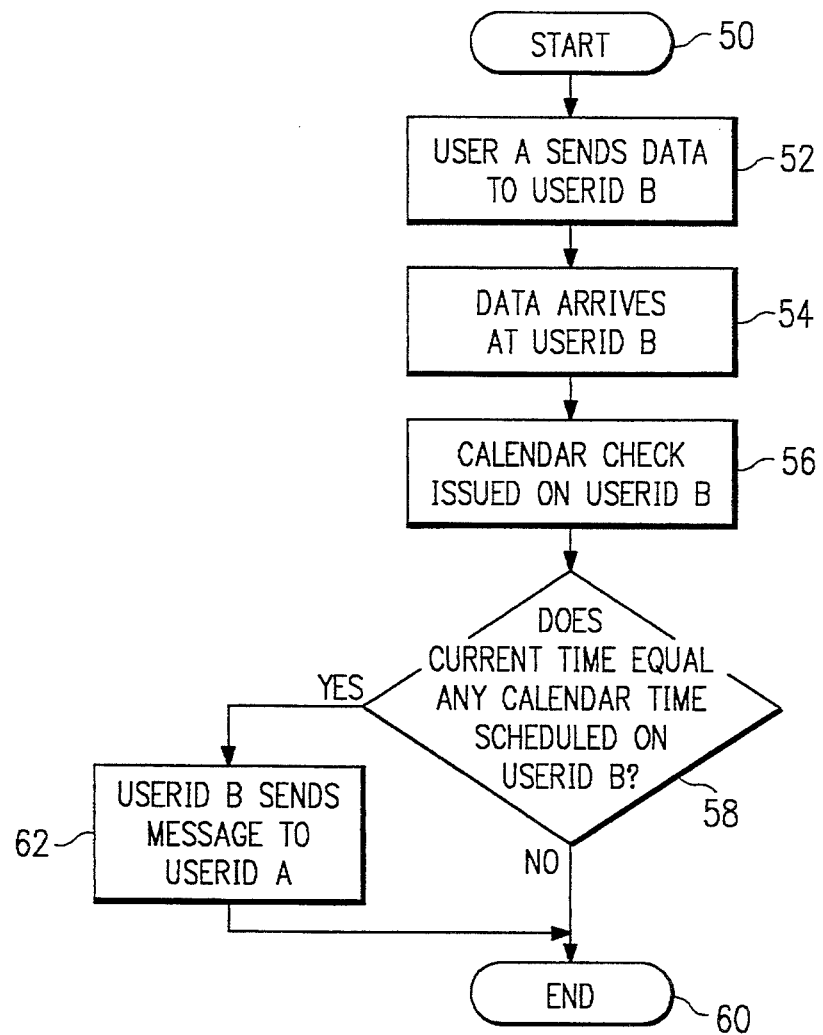

METHOD AND APPARATUS FOR LINKING ELECTRONIC MAIL AND AN ELECTRONIC CALENDAR TO PROVIDE A DYNAMIC RESPONSE TO AN ELECTRONIC MAIL MESSAGE

The application is a continuation of application Ser. No. 08/026,728, filed Mar. 5, 1993 now abandoned.

TECHNICAL FIELD OF THE INVENTION

This invention relates in general to computer software, and in particular, to a method and apparatus for providing a dynamic response to an electronic message from an electronic calendar.

BACKGROUND OF THE INVENTION

Electronic mail systems are well known in the art. Such systems are used to send messages, notes, and etc. from one person to another through interconnected computer systems. Such interconnections may be a few feet or thousands of miles in length.

A problem may occur with the use of electronic mail systems when a sender anticipates a response from the addressee within a specified period of time. The problem occurs when the addressee is not present and/or is unable to view the message that has been sent. Thus, for example, if a sender has a need for information from an addressee, and the addressee is in a prolonged meeting, the addressee may not respond to the sender's request for a lengthy period of time. The sender, in all likelihood, does not know of the addressee's inability to view the message and respond appropriately. Thus, the sender may be disadvantaged in a business situation in which alternative sources might have been inquired if the addressee's current status where known.

In addition to electronic mail systems, many computer systems provide an electronic calendar. Some electronic calendars are accessible by persons other than the owner of the calendar. Thus, a sender of a message may be able to view the calendar of an addressee to determine whether that person is present or not. However, such cross calendaring functions may be cumbersome to operate, and if a sender is in a hurry, may be forgotten. There are also techniques that can be used by one to inform others of an out-of-office or away status. Such techniques include "DELEGATE" and "AWAY" but require action, such as typing information on a command line. If a person is in a hurry, such action may be easily forgotten.

Thus, there is a need for a link between a calendar system and an electronic mail system. Such a link would provide a search to an addressee's calendar when a message is received. Should it be determined that there is a meeting or other event on the addressee's calendar, a reply message could be sent back to the sender providing such information. Then, the sender would immediately know if it were necessary to proceed with alternative solutions.

SUMMARY OF THE INVENTION

The present invention provides a method and apparatus for a dynamic calendar response which reduces or substantially eliminates problems with prior art systems. The present invention allows a sender to immediately be informed if the addressee is unavailable.

In accordance with one aspect of the present invention, a method provides a dynamic response to an electronic message on a data processing system. An electronic calendar is searched for any scheduled event overlapping a time of receipt of the message. A display is sent back to the sender of the message providing information about the scheduled event.

In another aspect of the present invention, the start and stop time of the event are displayed to the sender. In addition, what the event comprises (meeting, vacation, etc.) is displayed to the sender.

It is a technical advantage of the present invention that a sender will be immediately informed of any events effecting a response from the addressee. It is a further technical advantage of the present invention that no action is required on the part of the addressee.

BRIEF DESCRIPTION OF THE DRAWINGS

For a more complete understanding of the present invention and the advantages thereof, reference is now made to the Detailed Description taken in conjunction with the attached Drawings, in which:

FIG. 2 illustrates an example of a response provided through use of the present invention; and FIG. 3 illustrates a flow diagram of the present invention.

DETAILED DESCRIPTION OF THE INVENTION

Figure 1:
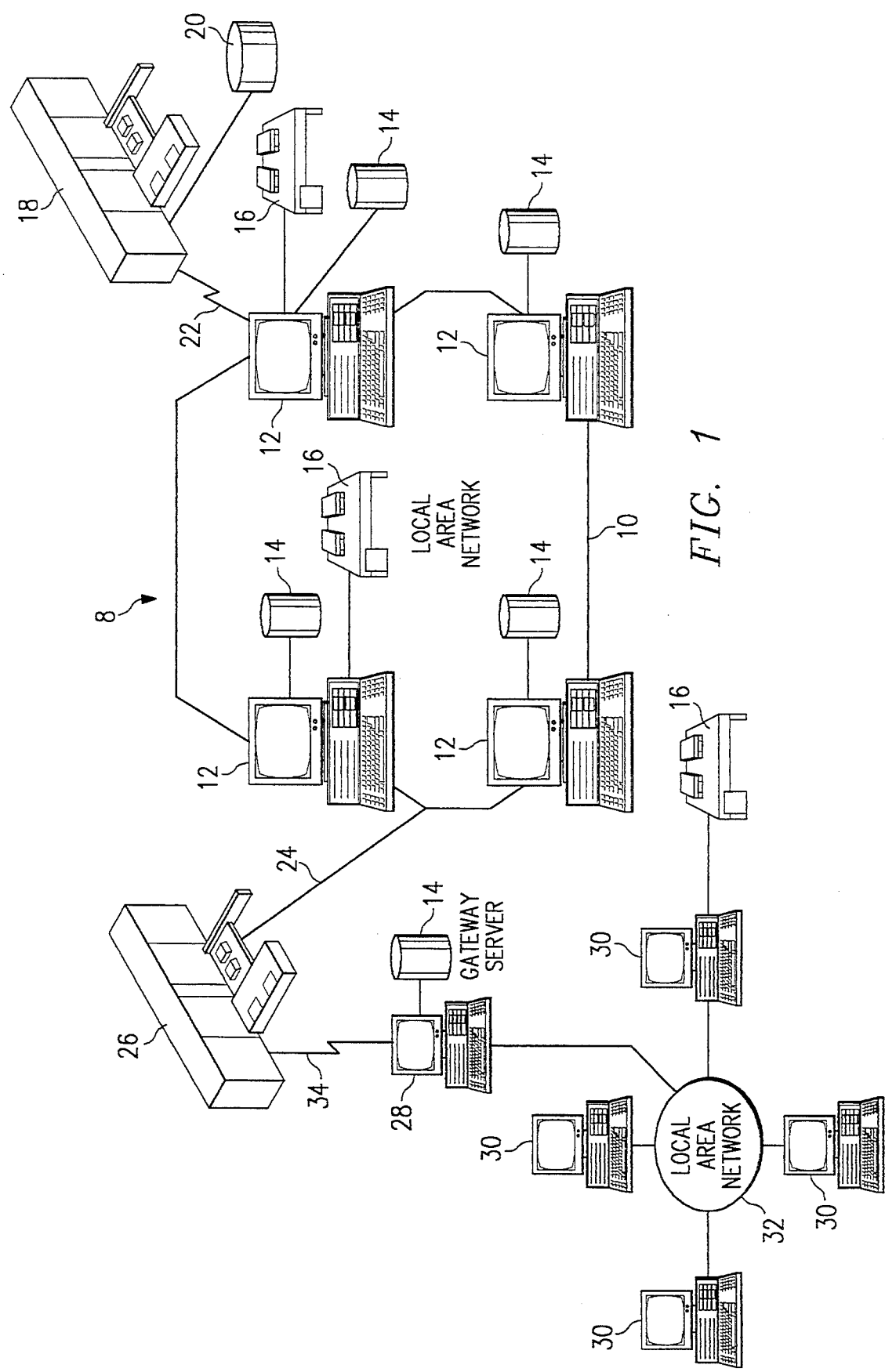
FIG. 1 is a schematic illustration of a data processing system in accordance with the present invention.

Referring first to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18 which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. The gateway server 28 is preferably an individual computer or Intelligent Workstation (IWS) which serves to link LAN 32 to LAN 10.

With respect to LAN 32 and LAN 10, a plurality of documents or resource objects may be stored within storage device 20 and controlled by mainframe computer 18 as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within Texas, and mainframe computer 18 may be located in New York.

Thus, a sender may be located in New York while an addressee may be located in Texas. If the sender in New York sends a request for information via an electronic mail system to the Texas addressee, and the Texas addressee is not present, there is potential for problems. While there are cross calendar systems available, they may be cumbersome and slow to use. In addition, other functions such as "DELEGATE" and "AWAY" require action by the addressee prior to departing for a meeting, etc. A sender typically wants to know as quickly as possible whether or not an addressee is available to respond for a request for information. Therefore, the present invention provides a solution to the above identified problem without requiring additional action by the addressee.

Referring to FIG. 2, an example of a message created as a result of the present invention is illustrated. A message was sent to USERID LARRY possibly requesting information on a project. When the message was received by USERID LARRY's electronic mail system, a check was made with USERID LARRY's electronic calendar. As a result of that check, it was determined that USERID LARRY has a meeting from 9:00 a.m. to 11:00 a.m. with Homer in room 4492. Since the message was received by USERID LARRY's electronic mail system at 9:44 a.m., the response as shown in FIG. 2 was returned to the sender of the request. Therefore, the sender will know that USERID LARRY is unavailable at least until 11:00 a.m. If the sender needs information from USERID LARRY prior to 11:00 a.m., it will be obvious that another source must be investigated. As a result of the present invention, a sender will be able to avoid a possible prejudicial situation due to the unavailability of requested information from an addressee.

Referring to FIG. 3, a flow diagram illustrates the use of the present invention. After starting at 50, a sender or user A sends data to the addressee, USERID B, at block 52. At block 54, the data arrives at USERID B, and an automatic calendar check is issued on USERID B at block 56. It is then determined at decision block 58, whether or not the current time equals any calendar time scheduled on USERID B. If the response to decision block 58 is no, the present invention ends at block 60. If the response to decision block 58 is yes, USERID B sends a message to USERID A indicating the scheduled time on USERID B at block 62. The present invention then ends at 60.

As a result of the present invention, a sender will be able to quickly determine whether there is enough time to wait for a response from an addressee. There is no requirement for the addressee to do anything additional prior to departing for a scheduled event to provide this information (assuming, of course, that the event is entered on the addressee's electronic calendar). Thus, the sender may avoid a prejudicial situation by obtaining needed information from an alternative source.

Although the present invention has been particularly shown and described with reference to a preferred embodiment, it will be understood by those skilled in the art that various changes in form and detail may be made without departing from the spirit and the scope of the invention.

What is claimed is:

1. A computer implemented method of providing a dynamic response to an electronic mail message on a data processing system comprising at least a sender's computer and a recipient's computer by dynamically linking an electronic mail system to an electronic calendar system both of which are accessible by each computer, comprising the steps of:

sending an electronic mail message from the sender's computer to the recipient's computer by the electronic mail system;

receiving the message through the electronic mail system on the recipient's computer;

in response to receipt of the electronic mail message, automatically accessing with the recipient's computer a recipient's calendar on the electronic calendar system on the recipient's computer;

automatically searching said recipient's calendar on the calendar system of the recipient's computer for any scheduled event overlapping with a time of receipt of the message sent on the electronic mail system;

automatically sending information on said any scheduled event overlapping with the time of receipt back to said sender's computer by the electronic mail system; and automatically displaying on the sender's computer said information sent through the electronic mail system about said any scheduled event, wherein a sender is automatically informed of any potential events which may delay a response from a recipient without said sender having to exit the electronic mail system to separately access the electronic calendar system to check for said any potential events.

2. The method of claim 1, wherein said step of displaying comprises:
displaying a start time and a stop time for said event.

3. The method of claim 1, wherein said step of displaying comprises:
displaying what said event comprises.

4. A system for providing a dynamic response to an electronic mail message on a data processor comprising at least a sender's computer and a recipient's computer by dynamically linking an electronic mail system to an electronic calendar system both of which are accessible by each computer, comprising:

computer implemented means for sending an electronic mail message from the sender's computer to the recipient's computer by the electronic mail system;

computer implemented means for receiving the message through the electronic mail system on the recipient's computer;

in response to receipt of the electronic mail message, computer implemented means on the recipient's computer for automatically accessing a recipient's calendar on the electronic calendar system on the recipient's computer;

computer implemented means for automatically searching said recipient's calendar on the calendar system of the recipient's computer for any scheduled event overlapping with a time of receipt of the message sent on the electronic mail system;

computer implemented means for automatically sending information on said any scheduled event overlapping with the time of receipt back to said sender's computer by the electronic mail system; and computer implemented means for automatically displaying on the sender's computer said information sent through the electronic mail system about said any scheduled event, wherein a sender as automatically informed of any potential events which may delay a response from a recipient without said sender having to exit the electronic mail system to separately access the electronic calendar system to check for said any potential events.

5. The system of claim 4, wherein said means for displaying comprises:

computer implemented means for displaying a start time and a stop time for said event.

6. The system of claim 4, wherein said means for displaying comprises:

computer implemented means for displaying what said event comprises.

* * * * *